Dec. 3, 1963  D. F. DE VASCONCELLOS  3,112,570
OPTICAL SET
Filed June 6, 1960  3 Sheets-Sheet 1

INVENTOR.
Desio Fernandes de Vasconcellos
BY
atty.

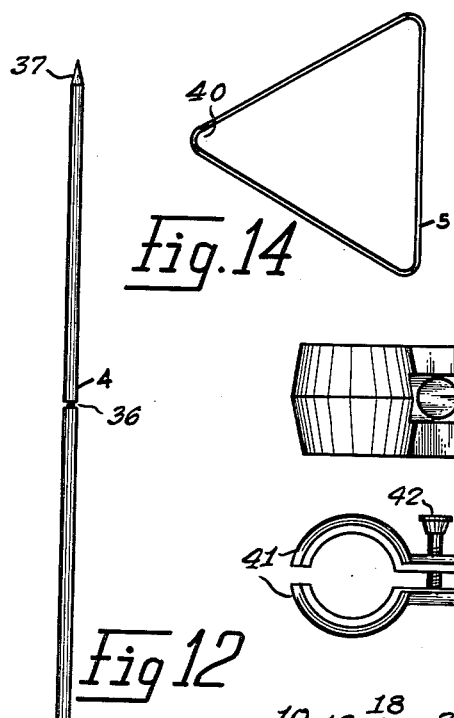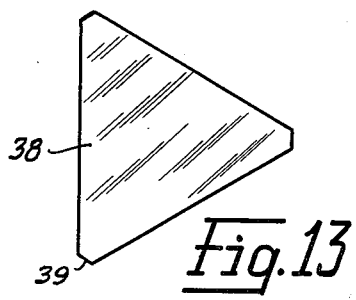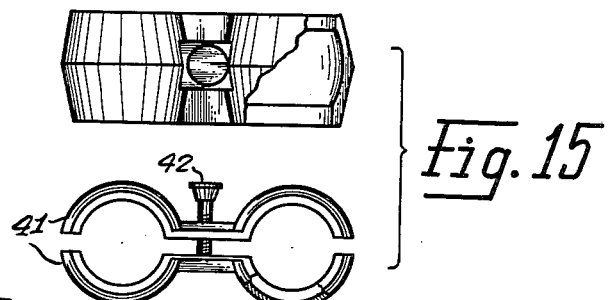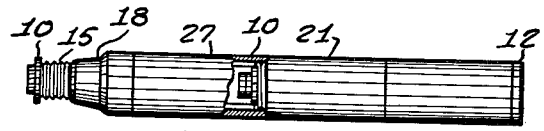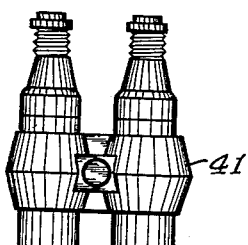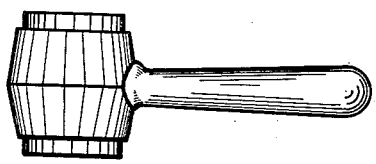

Dec. 3, 1963     D. F. DE VASCONCELLOS     3,112,570
OPTICAL SET

Filed June 6, 1960     3 Sheets-Sheet 3

INVENTOR.
Decio Fernandes de Vasconcellos
BY

United States Patent Office 3,112,570
Patented Dec. 3, 1963

3,112,570
OPTICAL SET
Decio Fernandes de Vasconcellos, Ave. Indianopolis 1706, Sao Paulo, Brazil
Filed June 6, 1960, Ser. No. 34,138
5 Claims. (Cl. 35—19)

It is generally known, mainly by teachers, scientists and researchers, that practical experiments as complement of the theory are necessary for the perfect understanding of the matter; these experiments are responsible for the greatest scientific discoveries of the last years.

Experiments in optics have been, however, restricted to a small group of privileged persons, who can avail themselves of the scientific and financial means of the great research laboratories located in factories and in a few universities. Students, teachers and amateurs have for a greater part no financial means for the study of the optical problems with the help of experiments.

The set of parts for mounting optical instruments, to which the present invention relates, will remedy the above mentioned drawbacks since it allows to carry out numerous experiments in the optical field, by means of a plurality of parts scientifically designed; by means of its parts, the set forming the subject matter of this invention, serves for the mounting of simple optical instruments such as magnifying glasses, as well as of the most complex ones, such as telescopes and microscopes. The instruments thus assembled are perfect for it is possible to make their parts with the necessary sturdiness and with the technical rigor exacted in high grade instruments.

This set of parts affords the following main advantages:

A. The purchase cost of the set is surprisingly low;

B. The number of experiments which can be carried out with the set is practically infinite;

C. The instruments are rapidly assembled;

D. The mounting of the instruments requires no special knowledge nor the use of any tool.

Figure 1:
Figure 2:
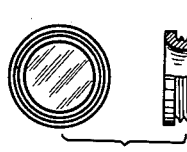
Figure 3:
Figure 4:
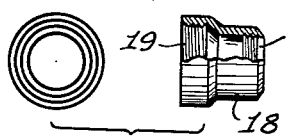
Figure 5:
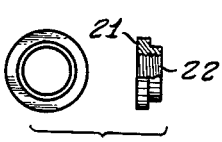
Figure 6:
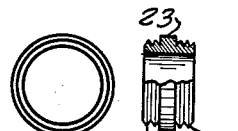
Figure 7:
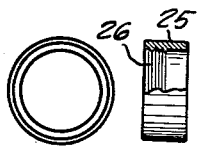
Figure 8:
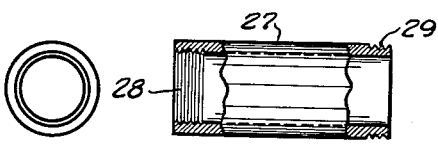
Figure 9:
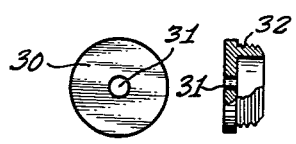
Figure 10:
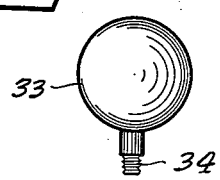
Figure 11:
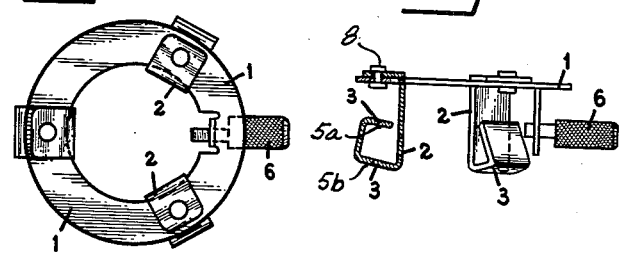
Figure 21:
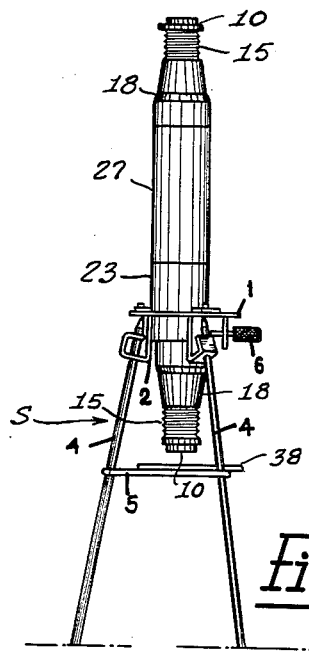

The accompanying drawings illustrate the invention, being:

FIG. 1 a front and side view, with partial section, of a lens which may be a converging or a diverging one, or an achromatic doublet;

FIG. 2 a front and side view, with partial section, of an achromatic objective;

FIG. 3 a front and side view, with partial section, of a threaded tube for oculars;

FIG. 4 a front and side view, with partial section, of a reducer for oculars;

FIG. 5 a front and side view, with partial section, of an intermediate support;

FIG. 6 a front and side view, with partial section, of a distancing connection;

FIG. 7 a front and side view, with partial section, of an adaptor for double objectives;

FIG. 8 a front and side view, with partial section, of a threaded tube, for structures;

FIG. 9 a front and side view of a support for the universal joint of FIG. 10;

FIG. 10 a view of a universal joint;

FIG. 11 a top and side view, with partial section, of a support for microscope or telescope;

FIG. 12 a side view of one of the legs of a support for microscope or telescope;

FIG. 13 a top view of a slide for microscope;

FIG. 14 a top view of the support for the slide;

FIG. 15 a side and a top view, with partial section, of two half-clamps connected by a screw;

FIG. 16 is a partial side elevational view and partial vertical section through a Galileo's telescope;

FIG. 17 a side view, with partial section, of a land telescope with re-inverting lens, internally located;

FIG. 18 a side view of a telescope without a support;

FIG. 19 a side view of a binocular;

FIG. 20 a side view of a magnifying glass;

FIG. 21 a side view of a microscope, and

Figure 22:
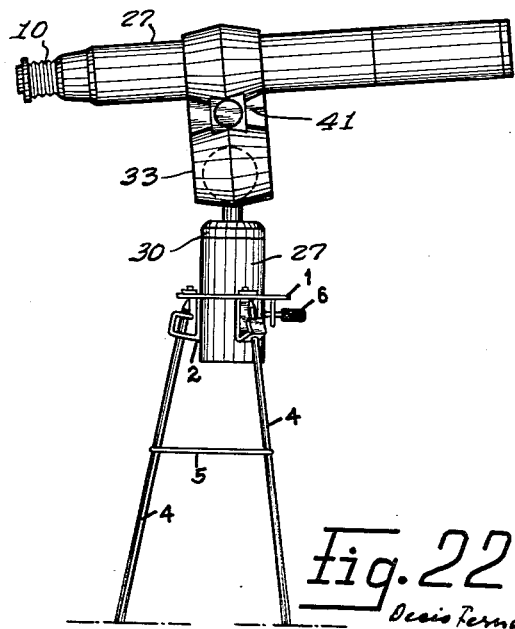

FIG. 22 a side view of a land telescope.

In FIG. 1 there is a mount 10 for a small lens 11 which may be converging or diverging or achromatic while a large objective lens 14 may have a similar mount 12 as shown in FIG. 2. As shown in FIG. 3, a tube 15 having external threads 16 and internal threads 17 is used for general mounting and adjustment. A reducing connector 18 shown in FIG. 4, is provided with separate sets of internal threads 19 and 20. An intermediate support ring 21 shown in FIG. 5 is provided with internal threads 22. A somewhat nipple-like connector 23 shown in FIG. 6 is provided with external threads 24.

In FIG. 7 there is shown an objective ring sleeve 25 having internal threads 26. Tubular distance members or spacers 27 shown in FIG. 8 have internal threads 28 at one end and external threads 29 at the other end thereof. As shown in FIG. 9, a headed plug 30 having a central threaded hole 31 through the head, and external threads 32 on the body thereof may be mounted in one end of the tubular spacer member 27 shown in FIG. 8, and a universal ball 33 shown in FIG. 10, the ball having a radially positioned threaded stem 34 projecting therefrom and integral therewith, may be mounted in the counterbore in the plug 30, and the mating hole in the tubular spacer member 27.

Certain assemblies of the aforementioned parts may be mounted on a ring stand S shown in FIGS. 21 and 22, the ring stand comprising a ring 1 having inner depending doubly hooked brackets 2 provided with holes 3 to receive the legs 4 of the stand in the upper and lower horizontal flanges or sections 5a and 5b of the hooked brackets as shown in FIG. 11. The brackets are secured to the ring 1 by eye brads 8, or double headed rivets, as shown in FIG. 11. The brackets may be biased to tend to spread the legs of the stand, so that a triangular band 5, shown in FIG. 14, may be wrapped around the legs and fitted to notches 36 in the circumferential outer surface of the legs 4, as shown in FIGS. 12 and 21 to give the stand increased stability. Stability is improved by providing the upper end of each of the legs with a conical portion 37 shown in FIG. 12, the conical portion of each leg fitting into a mating seat in the eye brad shown in FIG. 11 which is attached to the upper flange of each bracket. A tubular member 27 shown in FIG. 8 is disposed within three equally spaced brackets and supported thereby and may be held therebetween by a set screw 6 shown in FIGS. 11 and 22.

If an assembly forming a microscope or telescope is disposed on the stand, a triangular glass slide 38 as shown in FIG. 13, the glass slide having corners broken at 39, may be disposed on the band if the telescope assembly is offset relative to the legs of the stand, as shown in FIG. 21.

The assembly of various instruments is easily accomplished and perfect, as will be seen in the following examples:

Thus, for mounting a Galileo's telescope, the following parts are used: a diverging lens 10, a threaded tube for oculars 15, a reducer 18 for oculars, a threaded tube 27 for structures and an achromatic object-glass. These parts are mounted in the order indicated, there being obtained a Galileo's telescope, also named opera-glass, which gives, only with the above elements, a re-inverted image of the objects viewed.

For mounting a binocular, that is, for giving a stereoscopic vision of the objects, I use two Galileo's telescopes, connected by means of two half-clamps, as illustrated in FIG. 15. For assembling a microscope, we make use of the following parts: two converging lenses, a threaded tube 3 for eye-pieces, two reducers 18, a distancing connection 23, a threaded tube 27 for structures, a threaded tube for eye-pieces and an achromatic doublet.

The microscope as assembled may be mounted on the ring stand S as in FIG. 21.

A telescope, land or astronomical, may be mounted on the stand S by means of the clamp 41 embracing on the one hand the telescope and on the other, the ball 33, having its stem 34 screwed in the plug 30, in turn screwed into a tube section 27.

The various parts of the set can be used for mounting a high number of different instruments of the classic type and many others for experimental means, which can be the beginning of a new orientation in the optical field.

Having thus described my invention, what I claim is:

1. In a device for assembly into optical instruments and including at least two lens mounts having threads at one end and a tubular member provided with means for mounting the mounts at opposite ends thereof, a ring having three inner triply bent brackets having two horizontal portions provided with substantially alined holes and brads securing the respective brackets to the ring, legs disposed in the holes of the brackets, each leg being provided with an annular groove about half way down the leg, and a triangular band about the legs and in the grooves of the legs, and means for holding the tubular member in a predetermined position with respect to the ring.

2. An assembly as claimed in claim 1, the tubular member being held substantially coaxial with the ring.

3. An assembly as claimed in claim 1, said means for holding the tubular member in a predetermined position including a tube in and coaxial with the ring and a ball secured on the tube and a double clamp having one part embracing said tubular member and another part embracing the ball to mount the member for universal movement on the ring and legs.

4. In a device for assembly into optical instruments comprising, in combination, at least two lens mounts having threads at one end and a tubular member provided with means for mounting said lens mounts at opposite ends of said tubular member, a flat ring having three brackets fixed equidistantly about said ring, each of said brackets having a horizontal top portion, a downward extending portion bent from said top portion to extend vertically downward below the opening of said ring, a bottom portion bent from said downward extending portion extending below said top portion, an upward extending portion bent from said bottom portion opposite said downward extending portion, and an intermediate portion bent from said upward extending portion extending between said top portion and said bottom portion, said ring, said top portions, said bottom portions, and said intermediate portions containing apertures; eye brads extending through the apertures in said ring and through the apertures in said top portions of said brackets, each of said eye brads fixing a bracket to said ring; an inward projection of said ring bent downward and containing a threaded aperture; and a hand set screw extending through the threaded aperture in said inward projection, said set screw being turnable to extend below the opening in said ring opposite a downward extending portion of one of said brackets, said downward extending portions of said brackets extending along the sides of said first tubular member when said first tubular member is placed vertically downward through the opening in said ring;

legs having pointed upper ends and intermediate circumferential notches, said legs being inserted upward through the apertures in said bottom portions and said intermediate portions of said brackets with the pointed upper ends of each leg entering one of said eye brads; and a triangular band extending about said legs resting in the circumferential notches.

5. The combination according to claim 4 with the addition of a second tubular member provided with means for securing said lens mounts, and means for mounting said second tubular member transversely above the end of said first tubular member.

References Cited in the file of this patent

UNITED STATES PATENTS

| | | |
|---|---|---|
| 517,211 | Clarke | Mar. 27, 1894 |
| 1,521,339 | Taylor | Dec. 30, 1924 |
| 1,889,284 | Hansel | Nov. 29, 1932 |
| 2,157,157 | Anketell | May 9, 1939 |